US012563519B2

(12) United States Patent
Lee et al.

(10) Patent No.: US 12,563,519 B2
(45) Date of Patent: Feb. 24, 2026

(54) WIRELESS ACCESS NODE DEVICE CONFIGURED AS A SERVICE BASED ARCHITECTURE (SBA) AND INTERFACE METHOD PERFORMED BY WIRELESS ACCESS NODE DEVICE CONFIGURED AS AN SBA

(71) Applicant: SK TELECOM CO., LTD., Seoul (KR)

(72) Inventors: Dong Jin Lee, Seoul (KR); Seong Jun Lee, Seoul (KR); Hyun Jun Choi, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 427 days.

(21) Appl. No.: 18/031,386

(22) PCT Filed: Oct. 7, 2021

(86) PCT No.: PCT/KR2021/013786
§ 371 (c)(1),
(2) Date: Apr. 12, 2023

(87) PCT Pub. No.: WO2022/086000
PCT Pub. Date: Apr. 28, 2022

(65) Prior Publication Data
US 2023/0413210 A1 Dec. 21, 2023

(30) Foreign Application Priority Data
Oct. 19, 2020 (KR) ........................ 10-2020-0135271

(51) Int. Cl.
*H04W 60/00* (2009.01)
*H04L 65/40* (2022.01)
(Continued)

(52) U.S. Cl.
CPC ............. *H04W 60/00* (2013.01); *H04L 65/40* (2013.01); *H04W 88/08* (2013.01); *H04W 92/20* (2013.01); *H04W 92/24* (2013.01)

(58) Field of Classification Search
CPC ..... H04W 60/00; H04W 92/24; H04W 88/08; H04W 88/18; H04W 92/20; H04L 65/40; H04L 67/2866
See application file for complete search history.

(56) References Cited

U.S. PATENT DOCUMENTS

| | | | | |
|---|---|---|---|---|
| 2018/0270778 A1* | 9/2018 | Bharatia | ............. | H04L 65/1073 |
| 2019/0158360 A1 | 5/2019 | Xu et al. | | |

(Continued)

FOREIGN PATENT DOCUMENTS

| | | |
|---|---|---|
| CN | 109964509 | 7/2019 |
| CN | 111201823 | 5/2020 |

(Continued)

OTHER PUBLICATIONS

3GPP TSG-WG SA2 Meeting #137E e-meeting, Elbonia, Feb. 24-27, 2020 (S2-2002147) "Correction for Support of N5CW Devices to Access 5GC via Trusted WLAN Access Networks".
Chinese Office Action dated Mar. 26, 2025 issued in Application No. 202180071324.2.

(Continued)

*Primary Examiner* — Mounir Moutaouakil
(74) *Attorney, Agent, or Firm* — KED & ASSOCIATES, LLP

(57) ABSTRACT
The present disclosure suggests a scheme of uniformly embodying the functions of all equipment (RAN, core) including an RAN in addition to the core of 5G as NFs via realization of a detailed technique that evolves the function of RAN equipment to a 5G architecture and embodies the same as an NF.

13 Claims, 12 Drawing Sheets

(51) Int. Cl.
   *H04W 88/08*      (2009.01)
   *H04W 92/20*      (2009.01)
   *H04W 92/24*      (2009.01)

(56)           References Cited

U.S. PATENT DOCUMENTS

| | | | |
|---|---|---|---|
| 2019/0261187 A1* | 8/2019 | Chen | H04W 36/00 |
| 2022/0053391 A1* | 2/2022 | Lee | H04W 36/26 |

FOREIGN PATENT DOCUMENTS

| | | | | |
|---|---|---|---|---|
| WO | WO 2019/220172 | 11/2019 | | |
| WO | WO 2020/098946 | 5/2020 | | |
| WO | WO-2022033671 A1 * | 2/2022 | .... | H04W 36/008375 |

OTHER PUBLICATIONS

International Search Report dated Jan. 7, 2022 issued in Application No. PCT/KR2021/013786.

NGMN Alliance Project. Service-Based Architecture in 5G. NGMN White Paper on Service-based Architecture in 5G. S2-181431. SA WG2 #S2-125. Feb. 1, 2018.

3GPP; TSGSA; System architecture for the 5G System (5GS); Stage 2 (Release 16). 3GPP TS 23.501 V16.6.0. Sep. 24, 2020.

3GPP; TSGSA; Study on Enhancements to the Service-Based Architecture (Release 16). 3GPP TR 23.742 V16.0.0. Dec. 19, 2018.

Nokia et al. Addition of General SBA/SBI aspects in TS 33.117. S3-193029, 3GPP TSG-SA WG3 #96. Wroclaw, Poland. Aug. 30, 2019.

TTA Journal. No. 184, Jul. 2019, pp. 40-49. non-official translation (SHIN, Myeonggi et al. 5G Network/System (5GS) Standard Technology Trend.).

* cited by examiner

Receive       Process       Send

RANF SBI module
NF Interface
CP or UP packet (message)

FIG. 7

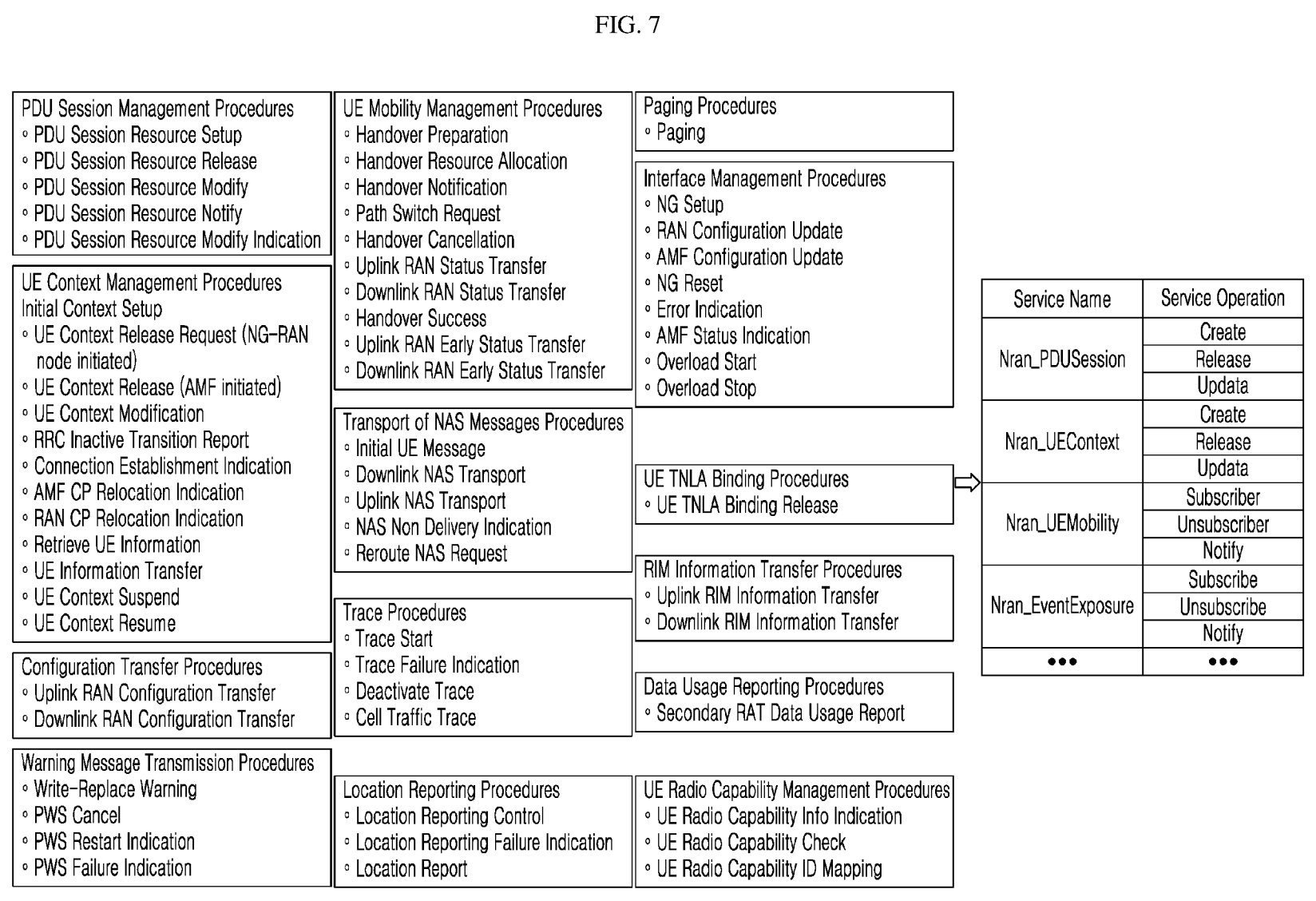

| Service Name | Service Operation |
|---|---|
| Nran_PDUSession | Create |
| | Release |
| | Update |
| Nran_UEContext | Create |
| | Release |
| | Update |
| Nran_UEMobility | Subscriber |
| | Unsubscriber |
| | Notify |
| Nran_EventExposure | Subscribe |
| | Unsubscribe |
| | Notify |
| ••• | ••• |

Paging Procedures
◦ Paging

Interface Management Procedures
◦ NG Setup
◦ RAN Configuration Update
◦ AMF Configuration Update
◦ NG Reset
◦ Error Indication
◦ AMF Status Indication
◦ Overload Start
◦ Overload Stop

UE TNLA Binding Procedures
◦ UE TNLA Binding Release

RIM Information Transfer Procedures
◦ Uplink RIM Information Transfer
◦ Downlink RIM Information Transfer

Data Usage Reporting Procedures
◦ Secondary RAT Data Usage Report

UE Radio Capability Management Procedures
◦ UE Radio Capability Info Indication
◦ UE Radio Capability Check
◦ UE Radio Capability ID Mapping

UE Mobility Management Procedures
◦ Handover Preparation
◦ Handover Resource Allocation
◦ Handover Notification
◦ Path Switch Request
◦ Handover Cancellation
◦ Uplink RAN Status Transfer
◦ Downlink RAN Status Transfer
◦ Handover Success
◦ Uplink RAN Early Status Transfer
◦ Downlink RAN Early Status Transfer

Transport of NAS Messages Procedures
◦ Initial UE Message
◦ Downlink NAS Transport
◦ Uplink NAS Transport
◦ NAS Non Delivery Indication
◦ Reroute NAS Request

Trace Procedures
◦ Trace Start
◦ Trace Failure Indication
◦ Deactivate Trace
◦ Cell Traffic Trace

Location Reporting Procedures
◦ Location Reporting Control
◦ Location Reporting Failure Indication
◦ Location Report

PDU Session Management Procedures
◦ PDU Session Resource Setup
◦ PDU Session Resource Release
◦ PDU Session Resource Modify
◦ PDU Session Resource Notify
◦ PDU Session Resource Modify Indication

UE Context Management Procedures
Initial Context Setup
◦ UE Context Release Request (NG-RAN node initiated)
◦ UE Context Release (AMF initiated)
◦ UE Context Modification
◦ RRC Inactive Transition Report
◦ Connection Establishment Indication
◦ AMF CP Relocation Indication
◦ RAN CP Relocation Indication
◦ Retrieve UE Information
◦ UE Information Transfer
◦ UE Context Suspend
◦ UE Context Resume

Configuration Transfer Procedures
◦ Uplink RAN Configuration Transfer
◦ Downlink RAN Configuration Transfer

Warning Message Transmission Procedures
◦ Write-Replace Warning
◦ PWS Cancel
◦ PWS Restart Indication
◦ PWS Failure Indication

FIG. 8

| SBI module | | |
|---|---|---|
| Message address value<br>[ N-tuple Flow ID] | Message attribute value<br>[ N-tuple Property ID ] | Message content<br>[Header/Body] |
| [srcIP, dstIP, srcPort, dstPort, Protocol] | [ServiceName, ServiceOperation, AttributeName] | Content (e.g., Json) Information |
| [172.4.6.212, 48.4.1.77, 40311, 80, 6] | [Nran_PDUSession, CreateSMContext, SUPI] | ... |
| [172.4.6.214, 48.4.2.2, 2202, 443, 6] | [Nran_PDUSession, UpdateSMContext, UELocation] | ... |
| ... | ... | ... |

FIG. 11

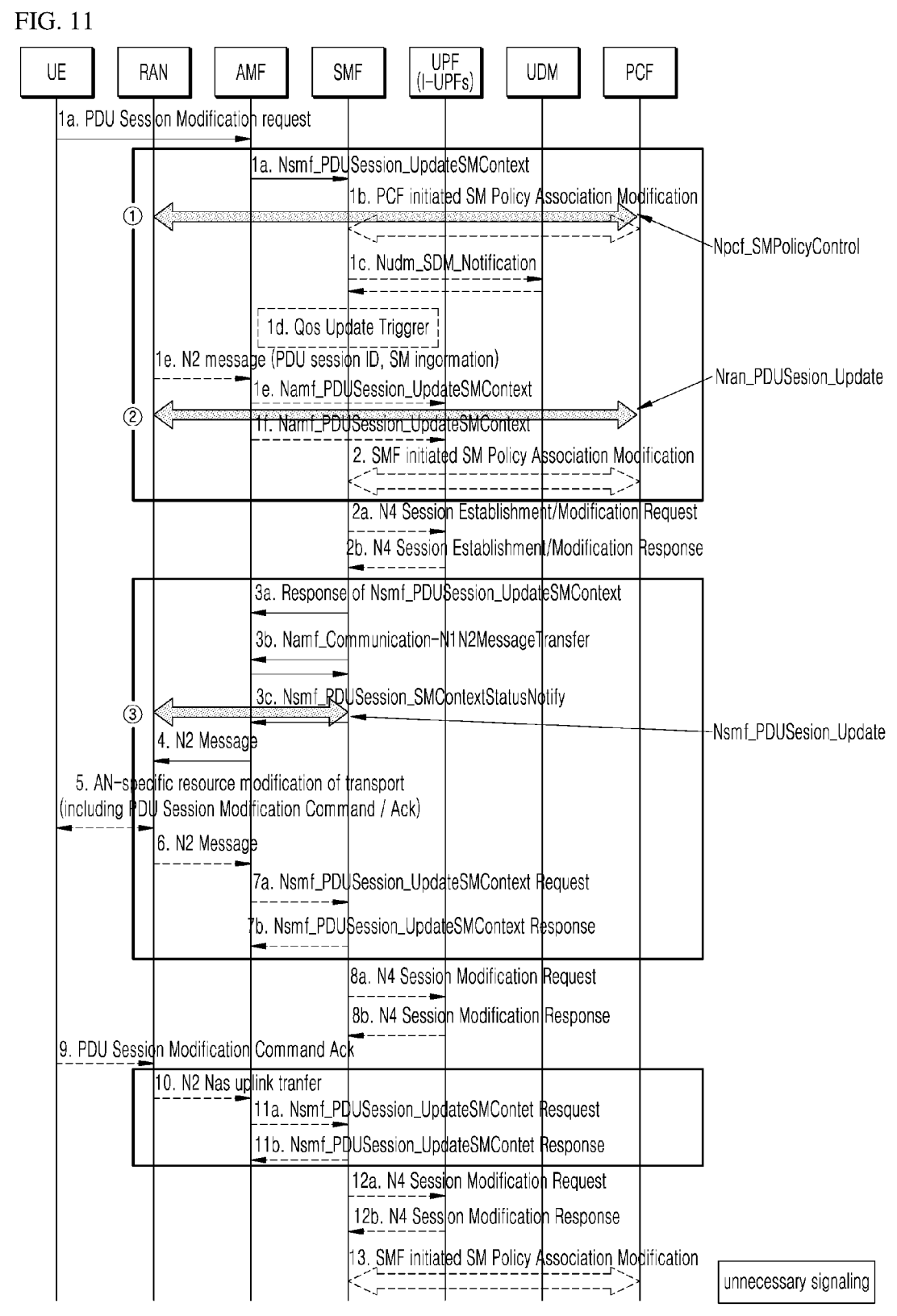

| UE | RAN | AMF | SMF | UPF (I-UPFs) | UDM | PCF |

1a. PDU Session Modification request

1a. Nsmf_PDUSession_UpdateSMContext

① 1b. PCF initiated SM Policy Association Modification
— Npcf_SMPolicyControl

1c. Nudm_SDM_Notification

1d. Qos Update Triggrer

1e. N2 message (PDU session ID, SM ingormation)
— Nran_PDUSesion_Update

1e. Namf_PDUSession_UpdateSMContext

② 1f. Namf_PDUSession_UpdateSMContext

2. SMF initiated SM Policy Association Modification

2a. N4 Session Establishment/Modification Request

2b. N4 Session Establishment/Modification Response

3a. Response of Nsmf_PDUSession_UpdateSMContext

3b. Namf_Communication-N1N2MessageTransfer

3c. Nsmf_PDUSession_SMContextStatusNotify

③ 4. N2 Message
— Nsmf_PDUSesion_Update

5. AN-specific resource modification of transport
(including PDU Session Modfication Command / Ack)

6. N2 Message

7a. Nsmf_PDUSession_UpdateSMContext Request

7b. Nsmf_PDUSession_UpdateSMContext Response

8a. N4 Session Modification Request

8b. N4 Session Modification Response

9. PDU Session Modification Command Ack

10. N2 Nas uplink tranfer

11a. Nsmf_PDUSession_UpdateSMContet Resquest

11b. Nsmf_PDUSession_UpdateSMContet Response

12a. N4 Session Modification Request

12b. N4 Session Modification Response

13. SMF initiated SM Policy Association Modification unnecessary signaling

WIRELESS ACCESS NODE DEVICE CONFIGURED AS A SERVICE BASED ARCHITECTURE (SBA) AND INTERFACE METHOD PERFORMED BY WIRELESS ACCESS NODE DEVICE CONFIGURED AS AN SBA

CROSS-REFERENCE TO RELATED PATENT APPLICATIONS

This application is a U.S. National Stage Application under 35 U.S.C. § 371 of PCT Application No. PCT/KR2021/013786, filed Oct. 7, 2021, which claims priority to Korean Patent Application No. 10-2020-0135271, filed Oct. 19, 2020, whose entire disclosures are hereby incorporated by reference.

TECHNICAL FIELD

The present disclosure relates to radio access network (RAN) technology.

This application is based on and claims priority to Korean Patent Application No. 10-2020-0135271, filed on Oct. 19, 2020, in the Korean Intellectual Property Office, the disclosure of which is herein incorporated by reference in its entirety.

BACKGROUND ART 5G defines a network structure for supporting a user equipment (UE), a base station (access), a core, and a server in an end to end manner.

In addition, 5G defines a network structure in which control plane for a control signaling function and a user plane for a data transmission/reception function are divided by separating a control signaling function and a data transmission/reception function that have been complexly performed by a single node (e.g., S-GW, P-GW, and the like) in legacy LTE (4G).

In this instance, a control node of a control plane (CP) in 5G may be defined as an access and mobility management function (AMF) that controls radio section access of a user equipment (UE), a policy control function (PCF) that manages and controls a policy such as subscribed service information, payment, and the like for each UE and UE information, a session management function (SMF) that controls/manages a session for using a data service for each UE, a network exposure function (NEF) that is in charge of a function of sharing information with an external network, an unified data management/authentication function (UDM/AUSF) that manages/controls a user subscriber DB and authentication, a network repository function (NRF) that performs a function of managing/controlling information associated with each network function (NF) in a network, a charging function (CHF) that processes payment of a subscriber, and the like.

In 5G, a data node of the user plane (UP) in 5G may be defined as a user plane function (UPF) that performs data transmission or reception between a UE and a server in an external service network (e.g., Internet) via a session with the UE based on the control by (interoperation with) an SMF.

A 5G core may define NFs that perform predetermined functions, and the NFs are defined to interoperate therebetween using a service based interface (SBI).

The 5G core performs communication using an SBI between NF services, and thus core NFs may be significantly easily installed, distributed, and upgraded. In addition, virtualization (VNF, CNF) may be configured and system resources may be efficiently used.

In the case of a radio access network (RAN) in 5G, the standard has focused on radio communication of the RAN, and thus the RAN fails to evolve into a new 5G architecture and still uses a legacy interface (e.g., N2 or the like).

According to the current level of 5G technology, evolution to a 5G architecture and implementation of an NF are only enabled in a core, but evolution to a 5G architecture and implementation of an NF are not yet applied in RAN.

Accordingly, the present disclosure suggests a detailed technique that allows the function of RAN equipment evolve to a 5G architecture and be implemented as an NF, so as to uniformly implement the functions of all equipment (RAN, core) including the RAN and the core of 5G as NFs.

DISCLOSURE OF INVENTION

Technical Problem

The present disclosure suggests a detailed technique that allows the function of RAN equipment evolve to a 5G architecture and be implemented as an NF, so as to uniformly implement the functions of all equipment including the RAN and the core of 5G (RAN, core) as NFs.

Solution to Problem

A radio access node device according to an embodiment of the present disclosure may be configured as a service based architecture (SBA) that performs communication using a message via an inter-network function (NF) service based interface (SBI).

A radio access node device according to an embodiment of the present disclosure may include an NF communication unit configured to perform communication required in association with provision of the service to an accessed user equipment (UE), and the NF communication unit may perform communication using an SBI message via an inter-NF service based interface (SBI).

Specifically, an NF that the NF communication unit communicates with is at least one of another node device for configuring a base station with the radio access node device, another radio access node device, an NF service in another radio access node device, an NF of a control plane, and an NF of a user plane.

Specifically, the NF communication unit may include an SBI module that processes the SBI message.

Specifically, the SBI module may be configured to operate according to at least one of a request/response-based message transmission or reception scheme and a subscription/notification-based message transmission or reception scheme.

Specifically, the SBI module may be configured to perform conversion between a message via another interface and the SBI message via the SBI when performing message transmission or reception.

Specifically, the NF communication unit may be configured to use an SBI message when transmitting or receiving a message related to radio section handover of the UE.

Specifically, the NF communication unit may be configured to use an SBI message when transmitting a notification upon detection of a predetermined event that is subscribed (subscription) in advance by an access and mobility management function (AMF).

Specifically, the NF communication unit may be configured to use an SBI message when transmitting or receiving a message related to UE context associated with the UE.

Specifically, the NF communication unit may be configured to directly communicate with a session management function (SMF), which manages/controls a UE session, by using an SBI message without passing through an access and mobility management function (AMF) when processing session management of the UE.

Specifically, the NF communication unit may be configured to directly communicate with a policy control function (PCF), which manages/controls a plurality of policies including a QoS policy, by using an SBI message without passing through an access and mobility management function (AMF) when performing processing related to quality (QoS policy) of the UE.

Specifically, the NF communication unit may be configured to perform direct communication by using an SBI message without passing through an access and mobility management function (AMF) when processing registration that registers an NF of the radio access node device with a network repository function (NRF) that manages/controls information associated with each NF in a network.

An interface method performed by a radio access node device according to an embodiment of the disclosure may include a communication operation that performs communication related to provision of a service provided to an accessed user equipment (UE), and the communication operation may perform communication using an SBI message via an inter-NF service based interface (SBI).

Advantageous Effects of Invention

According to a radio access node device and an interface method performed by the device according to an embodiment of the disclosure, a detailed technique that allows the function of RAN equipment evolve to a 5G architecture and be implemented as an NF may enable the functions of all equipment (RAN, core) including the RAN and the core of 5G to be uniformly embodied as NFs.

BRIEF DESCRIPTION OF DRAWINGS

Figure 1:
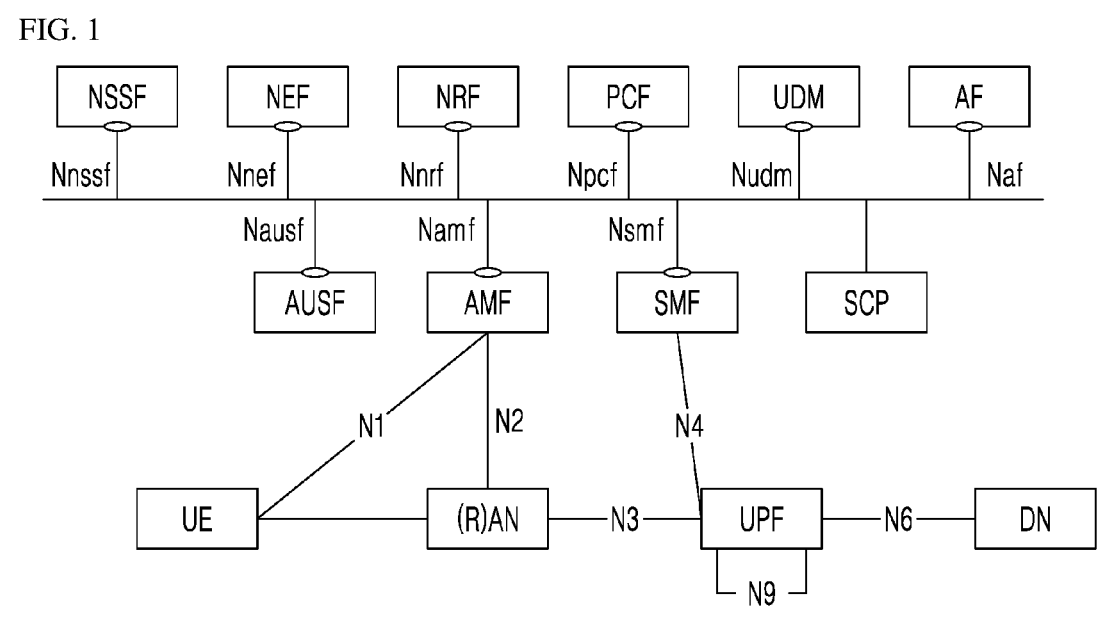

FIG. 1 is a diagram illustrating the structure of a 5G system.

FIG. 6 is a diagram illustrating a process of processing an SBI message in a radio access node device (RANF) according to an embodiment of the disclosure.

FIG. 7 is a diagram illustrating an example of defining an SBI message used by a radio access node device (RANF) according to an embodiment of the disclosure.

FIG. 8 is a diagram illustrating an example of defining an SBI message value managed by a radio access node device (RANF) according to an embodiment of the disclosure.

FIGS. 9 to 12 are flowcharts illustrating communication scenarios according to interface methods performed by a radio access node device (RANF) according to an embodiment of the disclosure.

BEST MODE FOR CARRYING OUT THE INVENTION

Figure 2:
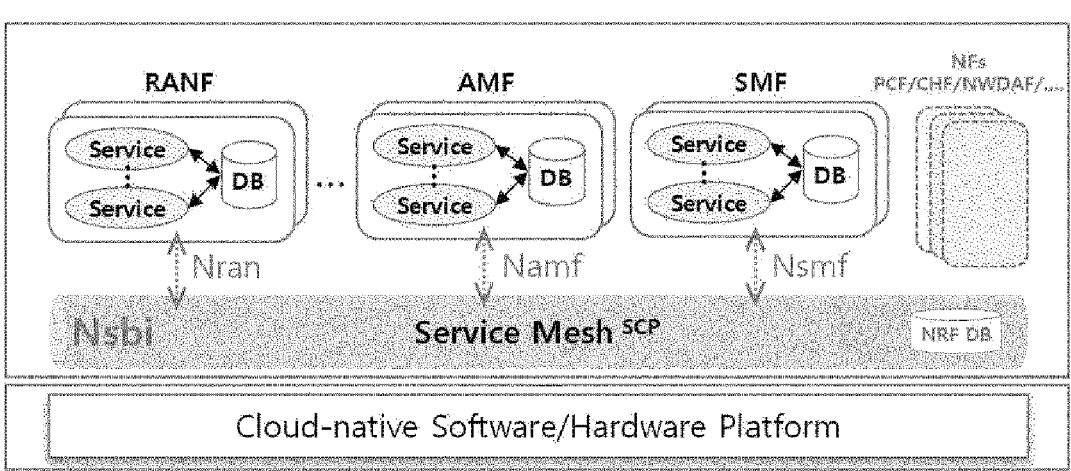
FIG. 2 and FIG. 3 are diagrams illustrating the concept of configuring a function of RAN equipment as an SBA in the present disclosure.

Hereinafter, embodiments of the present disclosure are described with reference to the accompanying drawings.

The present disclosure relates to a technique that embodies the function of RAN equipment as a network function (NF) so as to uniformly embody the functions of all equipment (RAN, core) as NFs.

In 5G, a network structure is defined to support a user equipment (UE), a base station (access), a core, and a server in an end to end manner.

In addition, in 5G, a network structure is defined as a structure in which an area (control plane) for a control signaling function and an area (user plane) for a data transmission/reception function are divided by separating a control signaling function and a data transmission/reception function that have been complexly performed by a single node (e.g., an S-GW, a P-GW, and the like) in legacy LTE (4G).

In this instance, a control node of a control plane (CP) in 5G may be defined as an access and mobility management function (AMF) that controls radio section access of a user equipment (UE), a policy control function (PCF) that manages and controls a policy such as subscribed service information, payment, and the like for each UE and UE information, a session management function (SMF) that controls/manages a session for using a data service for each UE, a network exposure function (NEF) that is in charge of a function of sharing information with an external network, an unified data management/authentication function (UDM/AUSF) that manages/controls a user subscriber DB and authentication, a network repository function (NRF) that performs a function of managing/controlling information associated with each network function (NF) in a network, a charging function (CHF) that processes payment of a subscriber, and the like.

In 5G, a data node of the user plane (UP) in 5G may be defined as a user plane function (UPF) that performs data transmission or reception between a UE and a server in an external service network (e.g., Internet) via a session with the UE based on the control by (interoperation with) an SMF.

In addition, in 5G, a service communication proxy (SCP) is newly defined so as to process, via a mesh structure, various inter-NF service communication in which NFs commonly called control node (an AMF, a PCF, an SMF, or the like) of the CP and control node (a UPF) of the UP, which have been described above, perform communication using a service based interface (SBI).

Accordingly, in 5G, when an SCP is introduced, SBI message-based communication may be established between NFs via an SCP, the SBI message being a message provided in the common shape/structure.

A 5G core may define NFs that perform predetermined functions, and the NFs are defined to interoperate therebetween using a service based interface (SBI). Accordingly, the 5G core performs communication using an SBI between NF services, and thus corer NFs may be significantly easily installed, distributed, and upgraded, virtualization (VNF, CNF) may be configured, and system resources may be efficiently used.

In the case of a radio access network (RAN) in 5G, the standard has focused on radio communication of the RAN, and thus the RAN fails to evolve into a new 5G architecture and still uses a legacy interface (e.g., N2 or the like).

Therefore, in the current 5G, in the case of the RAN equipment such as a CU, a DU, an RU, and the like, functions are still heavy and costs are significantly high from the perspective of price/TCO. Decomposition thereof may be limited since a default legacy interface needs to be changed or the like. Due to those drawbacks, it is difficult to satisfy high service quality required by customers in the state in which 5G SA, or 6G communication in the future is needed.

According to the current level of 5G technology, evolution to a 5G architecture and embodiment of an NF are only embodied in a core, but evolution to a 5G architecture and embodiment of an NF are not yet applied in RAN.

Accordingly, the present disclosure suggests a detailed technique that allows the function of RAN equipment evolve to a 5G architecture and be implemented as an NF, so as to uniformly embody, as NFs, the functions of all equipment (RAN, core) including the RAN in addition to the core of 5G.

That is, the subject matter of the present disclosure is to embody the function of the RAN equipment as an NF, and to configure the same as a service based architecture (SBA).

To this end, the present disclosure suggests a radio access network node device (radio access network function (RANF)) that realizes/embodies the function of RAN equipment as an NF.

Accordingly, the radio access node device (RANF) proposed in the present disclosure has a feature of being embodied as a service based architecture (SBA) that performs communication using a message via an inter-network function (NF) service based interface (SBI).

In this instance, in the present disclosure, a radio access node device (RANF) that is embodied as an NF and is configured as an SBA may correspond to each RAN equipment (e.g., a CU, a DU, an RU, and the like) included in a 5G base station (gNB), and may correspond to a part of RAN equipment (e.g., a CU, a DU, an RU, and the like).

That is, the RANF in the present disclosure may be a CU-CP, a CU_UP, a DU_high, a DU_low, and the like.

Accordingly, RAN equipment (e.g., a CU, a DU, an RU, or the like) embodied as an RANF may embody a function (feature), provided by the equipment, as an SBI for each NF service unit, and may contain an SBI module (described later) that is in charge of such a processing.

Accordingly, as illustrated in FIG. 2, the RANF that is embodied as an NF and is configured as an SBA according to the present disclosure may enable direction communication (e.g., when introducing an SCP, based on a service mesh) even with another NF such as an SMF, a CHF, and the like via an SBI message, in the same manner as a core NF commonly called control node (an AMF, an SMF, a CHF, or the like) of a CP and control node (UPF) of an UP.

Therefore, according to the present disclosure, the RANF performs direct communication with another core NF such as an SMF, a CHF, and the like whereby an AMF that performs interworking may become lightweight. Furthermore, various performances may be improved, such as a procedure may be simplified by separating session management and mobility management, a change in NF information may be identified immediately, a Telco network capable of providing a seamless service even in the case of RM by strengthening a 5G feature of a stateless structure may be configured, and the like.

Hereinafter, for ease of description, a detailed description is provided with reference to an embodiment associated with a CU that performs communication close to that of a core network (e.g., an AMF) among RAN equipment (e.g., a CU, a DU, an RU, and the like) that may be embodied as an RANF.

Figure 3:
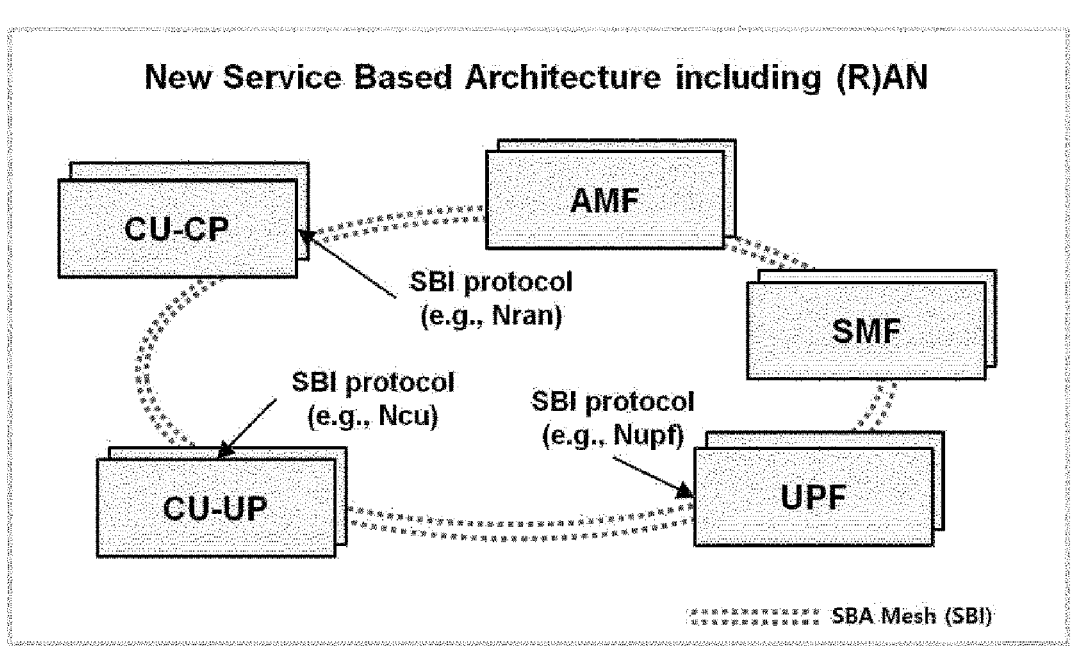

FIG. 3 is a diagram illustrating the concept of configuring, as an SBA, a CU that is an example of RAN equipment.

As shown in FIG. 3, in the present disclosure, a CU (CU-CP/CU-UP) that is classified based on a CP/UP may be configured as an SBA that performs communication using an SBI message.

In this manner, the CU-CP configured as an SBA according to the present disclosure may directly communicate with other NFs (including a CU-UP configured as an SBA), such as an SMF, a CHF, and the like, in addition to an AMF, via an SBI message (protocol), and a CU-UP configured as an SBA according to the present disclosure may directly communication with other NFs (including a CU-CP configured as an SBA), such as an UPF and the like, via an SBI message (protocol).

In this instance, as described in FIG. 3, RAN equipment (e.g., a CU, a DU, an RU, or the like) that is embodied as an RANF and is configured as an SBA may indicate an SBI message (protocol) via API unit-based classification of "Nxxx" (here, it is specified that xxx=NF), such as Nran in the case of a CU-CP, Ncu in the case of a CU-UP, and the like, depending on an NF service that is a function (feature) provided by the equipment and embodied as an SBI.

Hereinafter, a detailed description is provided with reference to an embodiment associated with a CU-CP that first communicates with a core network (e.g., an AMF) among RAN equipment (e.g., a CU, a DU, an RU, and the like) that may be embodied as an RANF.

Figure 4:
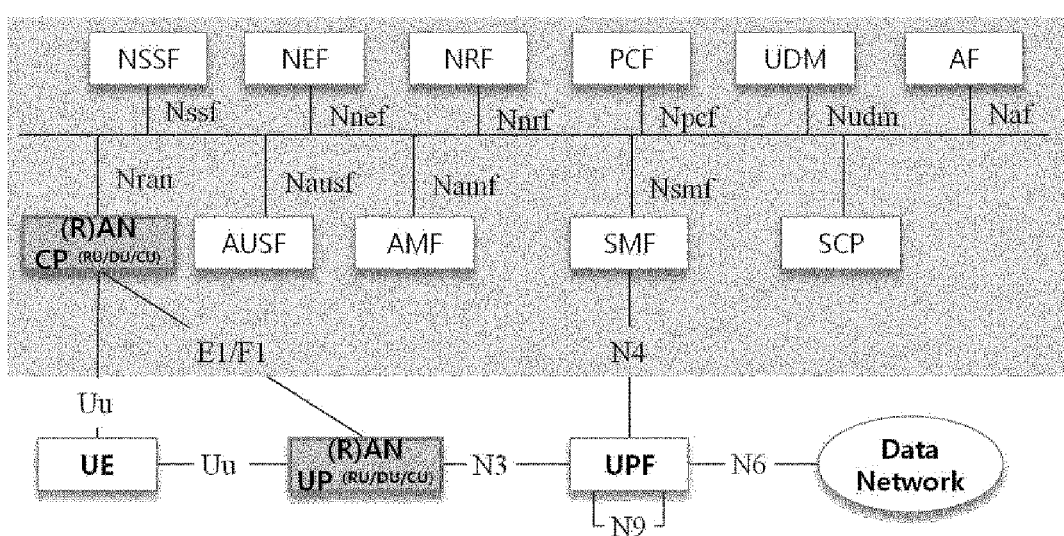
FIG. 4 is a diagram illustrating an embodiment of embodying a function of RAN equipment as an NF in the present disclosure.

That is, hereinafter, as illustrated in FIG. 4, a CU-CP configured as an SBA according to the present disclosure is referred to as an RANF (or a CU-CP NF) in a description provided below.

In the embodiment illustrated in FIG. 4, the RANF (or a CU-CP NF) may directly communicate with a core NF by using Nran (SBI message), and a CU-UP that is not configured as an RANF according to the present disclosure may communicate with an RANF (or a CU-CP NF) and a UPF via a legacy interface (E1, N3, and the like).

Figure 5:
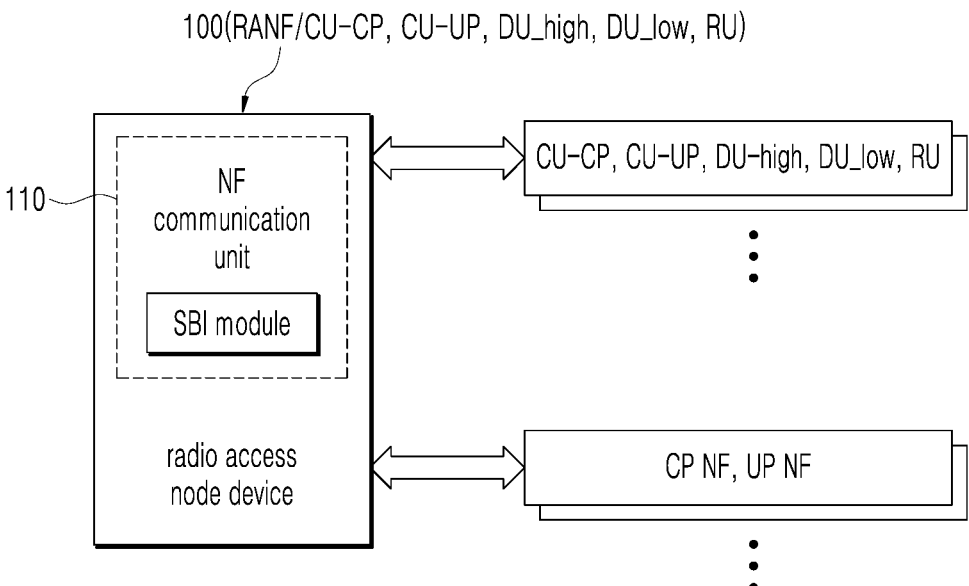
FIG. 5 is a block diagram illustrating the configuration of a radio access node device (RANF) according to an embodiment of the disclosure.

FIG. 5 is a diagram illustrating the configuration of a radio access node device (RANF) that realizes/embodies the function of RAN equipment as an NF, according to the present disclosure.

As described above, the RANF in the present disclosure may be a CU-CP, a CU_UP, a DU_high, a DU_low, an RU, or the like. However, for ease of description, a detailed embodiment is described with reference to a CU-CP that first communicates with a core network (e.g., AMF).

As illustrated in FIG. 5, the RANF 100 (e.g., a CU-CP NF) according to an embodiment of the disclosure may be the function of RAN equipment that is realized/embodied as an NF, the RAN equipment providing a service to an accessed user equipment (UE).

The RANF 100 (e.g., a CU-CP NF) of the present disclosure may include an NF communication unit 110 that performs, with an NF, communication required in association with provision of a service to a UE.

Here, the NF communication unit 110 may perform communication using an SBI message via an inter-NF service based interface (SBI).

The NF communication unit 110 may be include an SBI module that processes an SBI message.

That is, the RANF 100 (e.g., a CU-CP-NF) of the present disclosure may include the NF communication unit 110, particularly, a SBI module, which performs communication with an NF by using an SBI message, and may be configured as an SBA by embodying the function of RAN equipment (CU-CP) as an NF.

In this instance, an NF that communicates with the NF communication unit 110, particularly, an SBI module, may be at least one of another node device (e.g., a CU-UP, DU_high, DU_low, or RU configured as an SBA) configured for a base station (gNB) that is the same base station that the RANF 100 (e.g., a CU-CP NF) is configured for, another radio access node device (e.g., another CU-CP NF), an NF service in another radio access node device (e.g., another CU-CP NF), an NF (e.g., an AMF, an SMF, a PCF, or the like) of a CP, and an NF (e.g., a UPF) of a UP.

The SBI module contained/prepared in the RANF 100 (e.g., a CU-CP NF) of the present disclosure may operate at least one of a request/response-based message transmission or reception scheme and a subscription/notification-based message transmission or reception scheme.

Specifically, the SBI module contained/prepared in the RANF 100 (e.g., a CU-CP NF) of the present disclosure may be a message interface associated with processing (process) of each NF service corresponding to the function (feature) of a CU-CP embodied as an SBI for each NF service unit.

The SBI module may be an interface that processes reception (input, receive, ingress)/transmission (output, send, egress) associated with processing (process) of each NF service.

Such an SBI module may operate as a message interface associated with a request/response and subscription/notification.

In addition, when performing message transmission or reception, the SBI module contained/prepared in the RANF 100 (e.g., a CU-CP NF) of the present disclosure may convert between a message via another interface and an SBI message via an SBI.

That is, the SBI module contained/prepared in the RANF 100 (e.g., a CU-CP NF) of the present disclosure may process/convert a legacy protocol (e.g., a GTP-C, GTPP, SCTP, or the like) that is received (input, receive, ingress) and may transmit (output, send, egress) the same as an SBI message (SBI protocol), and may process/convert an SBI message (SBI protocol) that is received (input, receive, ingress) and may transmit (output, send, egress) the same as a legacy protocol (e.g., GTP-C, GTPP, SCTP).

According to an embodiment, the SBI module contained/prepared in the RANF 100 (e.g., a CU-CP NF) of the present disclosure may convert a legacy message of RAN equipment (e.g., a CU-UP) into an SBI for inter-RAN NF service communication (or inter-RANF service communication), and such a conversion function may be internalized as a process, or may convert a legacy message into an SBI.

As described above, based on the above-described SBI module, the RANF 100 (e.g., a CU-CP NF) of the present disclosure may perform direct communication (when employing an SCP, based on a service mesh) between each NF service corresponding to a CU-CP function (feature) embodied as an SBI and another NF service (inter-RAN, intra-RAN, RAN-core).

Hereinafter, a process of processing an SBI message in the RANF 100 (e.g., a CU NF) of the present disclosure will be described with reference to FIG. 6.

Figure 6:
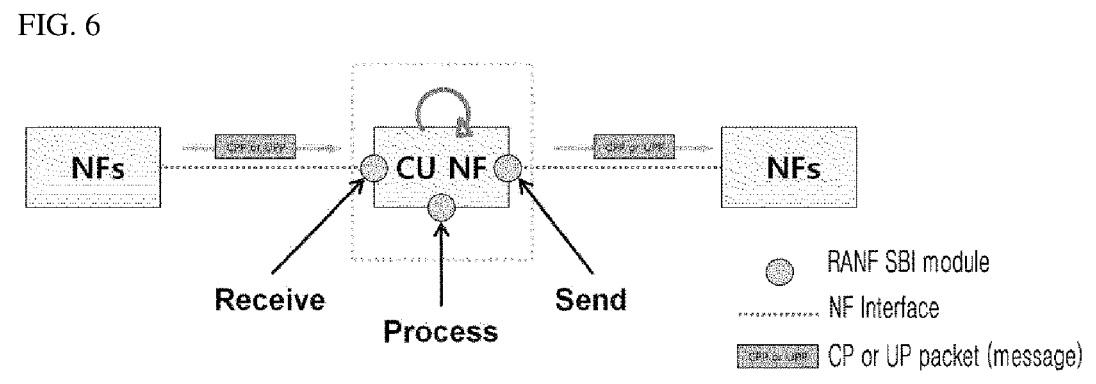

As shown in FIG. 6, the RANF 100 (e.g., a CU NF) of the present disclosure, particularly, an SBI module contained/prepared therein, may basically perform reception (input, receive, ingress)/processing (process)/transmission (output, send, egress).

Here, a message (SBI Msg.) that the SBI module interfaces with may be a data packet including a header of an application layer, such as HTTP, HTTP/2, QUIC, and the like defined in an SBI.

The message that the SBI module interfaces with may be understood as "data", "packet", "payload", "content", "header information", and the like. In addition, the type of a header included in the message may include GTP-C, GTP-U, TCP, IP, version information, and the like.

In addition, information included in the header in the message may include a source address, a destination address, a port number, and the like to enable transmission/reception. In addition, multiple (N) headers, as opposed to one header, may be included in the message.

As described above, the header in the message that the SBI module of the present disclosure interfaces with may include information for identifying the type of data and for identifying the actual content of the data, how to process the same, or the like.

Accordingly, an NF that receives the message may identify data based on the header in the message, and may be aware of how to process the same.

In this instance, as shown in FIG. 6, in the same manner of classifying a CU NF as a CU-CP NF and a CU-UP NF, the message managed by the RANF 100 (e.g., a CU NF) may be classified as a message of a CP and a message of an UP as shown below.

CPP: Control Plane Packet (including header information)

UPP: User Plane Packet (including header information)

Accordingly, particularly, the SBI module contained/prepared in the RANF 100 (e.g., a CU NF) of the present disclosure may be aware of how to classify a payload for each type of RANF based on a header in a message when performing reception (input, receive, ingress).

For example, upon receiving a predetermined CPP, the RANF 100 (e.g., a CU NF), particularly, the SBI module, may perform a procedure of interpreting/classifying a message and transferring the same to an appropriate processing (process) resource. In this instance, the SBI module may perform decapsulation or the like with respect to a header.

In the case of performing processing (process), the RANF 100 (e.g., a CU NF) of the present disclosure, particularly, the SBI module contained/prepared therein may process, based on a header in a message, a payload for each type of RANF according to the content of the message. A processing scheme is the same as an operation defined in the standard, and thus a detailed description thereof is omitted.

In the case of performing transmission (output, send, egress), the RANF 100 (e.g., a CU NF) of the present disclosure, particularly, the contained/prepared SBI module, may perform processing (process) for each type of RANF and may determine an NF to which the same is to be transmitted. As described above, generally, a CP NF (including a CU-CP NF) may perform transmission/sending with respect to an NF of the CP, and a UP NF (CU-UP NF) may perform transmission/sending with respect to an NF of the UP.

In this instance, the SBI module may input a destination address to a header to perform message transmission, and may also perform encapsulation/decapsulation and the like after additionally producing a header, as well as correcting a header.

The RANF 100 (e.g., a CU NF) of the present disclosure, particularly, the contained/prepared SBI module, may classify a message received (input, receive, ingress), may perform basic header processing (encapsulation/decapsulation)

on the message (data packet), and may perform a CP or UP function (actual processing) based on the header-processed packet. In the case of a DU/CU NF corresponding to a DU/CU configured as a single SBA may have a function (common plane I/F) capable of handling a CP and a UP in common.

Furthermore, the RANF 100 (e.g., a CU NF) of the present disclosure, particularly, the SBI module contained/prepared therein, may directly forward a message (data packet) to another NF when needed according to the state of the RANF and a process loading.

FIG. 7 is a diagram illustrating an example of defining an SBI message used by an RANF of the present disclosure, particularly, an RANF (CU-CP NF) that embodies a function of a CU-CP that first communicates with a core network (e.g., an AMF) as described in the above description.

In the present disclosure, an SBI message (protocol) for each NF service unit may be defined according to the function/role of RAN equipment itself embodied as an RANF, such as Nran, Ncu, Ncucp, Ndu, Nduhigh, Ndulow, or the like.

Therefore, an SBI message used by the RANF (CU-CP NF) that embodies the function of the CU-CP, for example, a service name for communication with an AMF, may be configured as an example as shown in Table of FIG. 7.

That is, the SBI message used by the RANF (CU-CP NF), for example, a service name for communication with an AMF, may be classified as four types as follows.

Nran_PDUSession: PDU session-associated processing

Nran_UEContext: management of UE management information

Nran_UEMobility: management of mobility of a UE

Nran_EventExposure: Subscriber/Notify of configuration of an RAN

For reference, the name and type of messages may be classified basically based on 'service name' and may be classified based on a service operation for each service name.

Each service operation is the type of a message exchanged between NFs and may basically include Create/Update/Delete/Subscribe/Unsubscribe, and the like.

Each service operation may be organized based on various attribute names (e.g., an SMF may be organized based on a SUPI, an S-NSSAI, a DNN, and the like).

A processing (process) logic for each RANF may vary according to the function and the feature of embodied RAN equipment (e.g., a CU, a DU, an RU, and the like).

For example, each NF including an AMF may be classified based on function categories of four types of service names, service operations associated therewith, attribute names associated therewith, and the like, and the corresponding NF (e.g., the AMF) may operate based thereon.

That is, processing (process) for each RANF may determine whether to perform a call processing process, or which call processing process is to be performed based on a service name, a service operation, and an attribute name, and may determine whether to process a predetermined service and message (Yes/No) based on a loading state (e.g., a CPU load, a memory usage, and the like) of itself.

FIG. 8 is a diagram illustrating an example of defining an SBI message value managed by a radio access node device (RANF) according to an embodiment of the disclosure.

That is, it may be a table that defines an SBI message value managed by an SBI module contained/prepared in the RANF 100 (e.g., a CU NF) of the present disclosure.

As illustrated in FIG. 8, a message address and a message attribute value may be matched for each processing (process) (e.g., a process ID) performed by an SBI module.

That is, when an SBI message, that is, a data packet, is entered, the SBI module may extract related contents, may allocate the same to a resource mapped to each processing (process ID), and may process the same.

For reference, a message address may be based on a minimum 5-tuple flow ID value, and a message attribute may be based on a minimum 3-tuple property ID. For reference, a tuple may also be wildcard *. In addition, such an N-tuple-based ID may be managed as a single integrated ID basically via hashing.

Hereinafter, embodiments in which the RANF 100 (e.g., a CU-CP NF) of the present disclosure performs communication using an SBI message are described.

According to an embodiment, the NF communication unit 110 (an SBI module) may use an SBI message when transmitting or receiving a message related to radio section handover of a UE.

That is, the RANF 100 (e.g., a CU-CP NF) of the present disclosure may use an SBI message (e.g., Xn H/O→Nxn H/O SBI message) even in an operation (e.g., Xn H/O) between RANFs.

According to another embodiment, the NF communication unit 110 (an SBI module) may use an SBI message when transmitting a notification upon detection of a predetermined event that an AMF subscribes (subscription) to in advance.

That is, in the present disclosure, other NFs including an AMF subscribes (subscription) to the RANF 100 (e.g., a CU-CP NF) of the present disclosure, and may immediately receive a notification when a predetermined RAN (e.g., an RAN instance, an RAN set, or the like) or an event associated with a predetermined RB (e.g., a change in information, a load, a value higher than or equal to/less than or equal to a threshold, H/O, a predetermined subscriber, a region, or the like) is detected.

According to another embodiment, the NF communication unit 110 (an SBI module) may use an SBI message when transmitting or receiving a message related to UE context associated with a UE.

That is, the RANF 100 (e.g., a CU-CP NF) of the present disclosure may perform communication using an SBI message even when communicating with an AMF in association with UE context.

According to another embodiment, in the case of processing session management of a UE, the NF communication unit 110 (e.g., an SBI module) may directly communicate with an SMF that manages/controls a UE session by using an SBI message, without passing through an AMF.

That is, the RANF 100 (e.g., a CU-CP NF) of the present disclosure may directly perform SBI communication with the SMF without passing through the AMF in the case of performing a PDU session control-related processing (e.g., create, update, delete, or the like).

According to another embodiment, in the case of performing quality (QoS policy)-related processing on a UE, the NF communication unit 110 (e.g., an SBI module) may directly communicate with a PCF, which manages/controls multiple policies including a QoS policy, by using an SBI message without passing through an AMF.

That is, the RANF 100 (e.g., a CU-CP NF) of the present disclosure may directly perform SBI communication with the PCF without passing through the AMF in the case of performing quality (QoS policy) related processing on a UE, and in the case of performing PDU session control processing (e.g., create, update, delete, or the like) on a UE.

As described above, a PCF and an SMF may also subscribe (subscription) to the RANF 100 (e.g., a CU-CP NF) of the present disclosure, and may immediately receive information (e.g., QoS scheduling information, a QoS priority, NW slice information, or the like) associated with a radio block (RB) via a notification when an event is detected. In this instance, direction communication from the RANF 100 (e.g., a CU-CP NF) may be performed via an SBI without passing through an AMF.

According to another embodiment, in the case of performing registration that registers an NF of the RANF 100 (e.g., a CU-CP NF) with an NRF that manages/controls information associated with each NF in a network, the NF communication unit 110 (an SBI module) may directly perform communication using an SBI message without passing through an AMF.

That is, the RANF 100 (e.g., a CU-CP NF) of the present disclosure may directly perform SBI communication with the PCF without passing through the AMF when performing registration related to an NF of the RANF 100.

In addition to the above-described embodiments, via SBI communication without passing through the AMF, the RANF 100 (e.g., a CU-CP NF) of the present disclosure may directly perform various types/categories of communication that is performed conventionally via an AMF in order to communicate with a core NF.

As described above, the present disclosure defines/embodies an SBI module in detail in order to allow the function of RAN equipment evolve to a 5G architecture and be implemented as an NF, thereby uniformly embodying, as NFs, the functions of all equipment (RAN, core) including the RAN in addition to the core of 5G.

In addition, in the present disclosure, as a radio access node device (RANF) containing/preparing an SBI module as described above is embodied, communication between a detailed RAN instance and an RAN set may be freely performed, and development, installation, and distribution (migration, pkg upgrade, duplication/multiplication) of the configuration of communication may be significantly easily evolved from the perspective of a standard.

In addition, in the present disclosure, as a radio access node device (RANF) containing/embodying an SBI module is realized as described above, inter-RAN communication and intra-RAN communication may be significantly effectively embodied and may be completed as a cloud-native structure. More freely, functions may be decomposed (decomposition), and a service may be quickly ready for each "function, feature, pkg, patch" efficiently in a container/VM virtualization environment.

In addition, in the present disclosure, a data processing scheme and signaling sensitive to a latency/performance may also use an SBI (e.g., new protocol of HTTP, HTTP/2 scheme) appropriate for Telco IT, and thus may further flexibly increase agility, may quickly improve function qualification and operation efficiency, and may promptly provide a new product service.

Hereinafter, an interface method performed by an RANF proposed in the present disclosure is described with reference to FIGS. 9 to 12.

As described above, an RANF proposed in the present disclosure may directly perform various types/categories of communication, which are performed conventionally via an AMF in order to communicate with a core NF, by using SBI communication without passing through an AMF, may communicate with the AMF using SBI communication, and may perform communication by applying an SBI to inter-RAN communication, intra-RAN communication, and the like.

Hereinafter, for ease of description, a few embodiments of various call flows, which may be performed by an RANF of the present disclosure via an SBI, are described.

Figure 9:
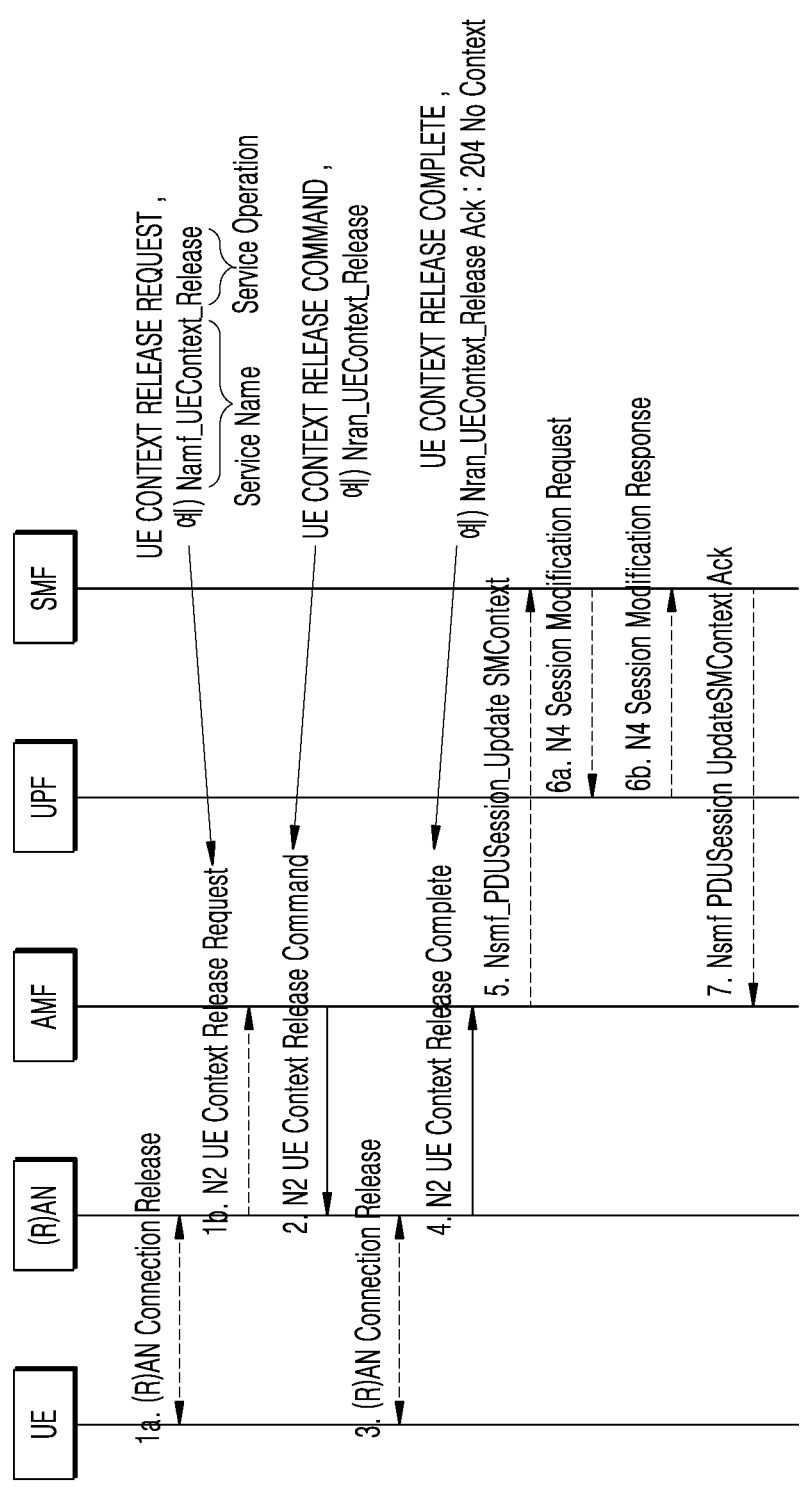

First, referring to FIG. 9, as an embodiment of a call flow in which an RANF of the present disclosure may perform via an SBI, a UE context-related call flow in association with communication with an AMF is described.

As illustrated in FIG. 9, in the case of a legacy RAN, a legacy interface, for example, an N2 interface, has been used when performing communication with an AMF in operations 1b, 2, and 4.

Conversely, according to the present disclosure, as illustrated in FIG. 9, an RANF of the present disclosure embodied as an NF by containing the above-described SBI module may perform, by using an SBI, communication of operations 1b, 2, and 4 in which the legacy RAN uses N2 interface.

UE CONTEXT RELEASE REQUEST->e.g.) Namf_U-
  EContext_Release
 UE CONTEXT RELEASE COMMAND->e.g.,) Nran_
  UEContext_Release
 UE CONTEXT RELEASE COMPLETE->e.g.,) Nran_
  UEContext_Release Ack: 204 No Context Subsequently, referring to FIG. 10, as an embodiment of a call flow in which an RANF of the present disclosure may perform via an SBI, a PDU session control (e.g., create, update, delete, or the like)-related call flow in association with direct communication with an SMF is described.

Figure 10:
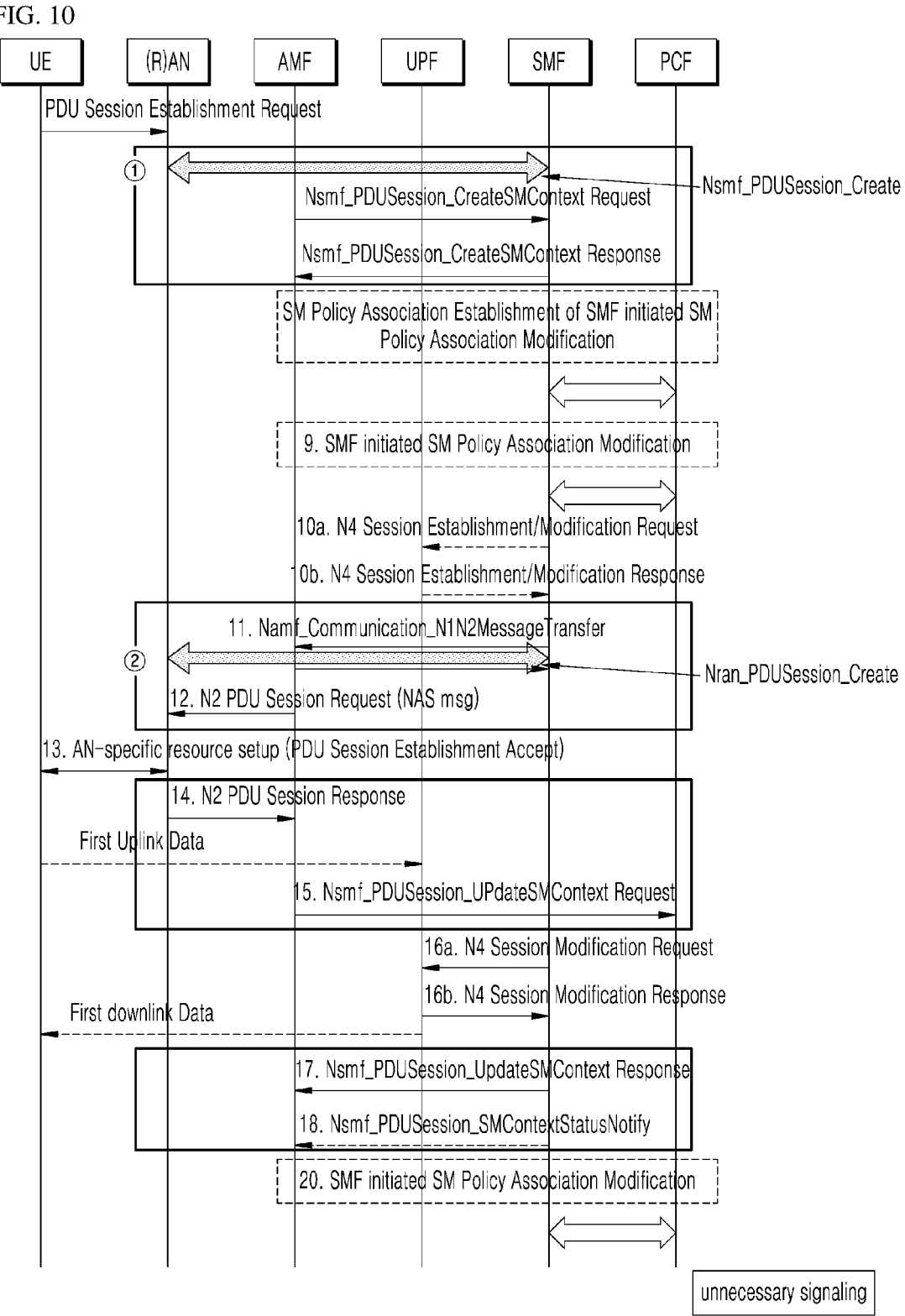

As illustrated in FIG. 10, a legacy RAN uses a legacy interface, for example, N2 interface, and thus may have a structure of performing communication with an SMF via an AMF.

Conversely, according to the present disclosure, as shown in FIG. 10, the RANF of the present disclosure embodied as an NF by containing the above-described SBI module may directly perform SBI communication with an SMF without passing through an AMF (①,②) whereby signaling (a box drawn in a dark grey line) that needs to pass through the AMF may be unnecessary and may be omitted.

In this instance, a call flow between an RANF and an SMF may be shorten/simplified, an AMF function may be optimized, and an overall signaling may be shortened.

Subsequently, referring to FIG. 11, as an embodiment of a call flow that an RANF of the present disclosure may perform via an SBI, a QoS policy-related call flow in association with direct communication with a PCF is described.

As illustrated in FIG. 11, a legacy RAN uses a legacy interface, for example, N2 interface, and thus may have a structure of performing communication with a PCF via an AMF.

Conversely, according to the present disclosure, as shown in FIG. 11, the RANF of the present disclosure embodied as an NF by containing the above-described SBI module may directly perform SBI communication with a PCF without passing through an AMF (①,②,③) whereby signaling (a box drawn in a dark grey line) that needs to pass through the AMF may be unnecessary and may be omitted.

Therefore, the call flow between the RANF and the PCF may be shortened/simplified, an AMF function may be optimized, and overall signaling may be shortened. Furthermore, the PCF may immediately receive information (e.g., QoS scheduling information, a QoS priority, an NW slice information, and the like) from the RANF.

Subsequently, referring to FIG. 12, as an embodiment of a call flow that an RANF of the present disclosure may perform via an SBI, an NF registration processing-related call flow in association with direct communication with an NRF is described.

Figure 12:
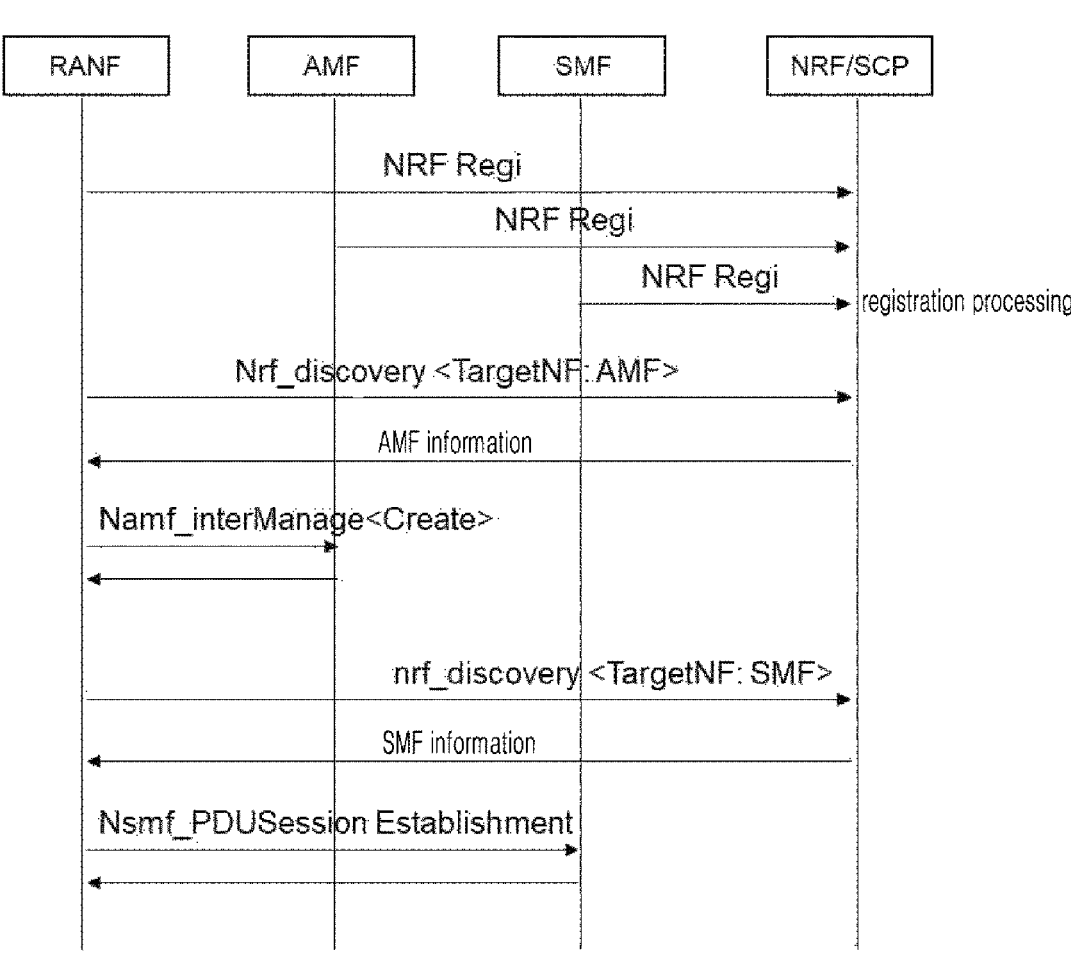

As illustrated in FIG. 12, according to the present disclosure, the RANF of the present disclosure embodied as an NF by containing the above-described SBI module may directly perform SBI communication with an NRF by using an SBI message (e.g., an NRF Regi) without passing through an AMF, in the same manner as a core NF such as an AMF, an SMF, or the like.

Furthermore, the RANF of the present disclosure may directly perform SBI communication with an NRF without passing through an AMF in the same manner as a core NF such as an AMF, an SMF, or the like, whereby various direct communication/interoperation, such as discovery of an NF (e.g., AMF, SMF, or the like) for processing a service request and the like, may be enabled.

As described above, the present disclosure defines/embodies an SBI module in detail in order to allow the function of RAN equipment evolve to a 5G architecture and be implemented as an NF, thereby uniformly embodying, as NFs, the functions of all equipment (RAN, core) including the RAN in addition to the core of 5G.

The interface method according to an embodiment of the present disclosure may be embodied in the form of a program command executable via various computer means, and may be recorded in a computer readable medium. The computer readable medium may include a program command, a data file, a data structure, and the like independently or in combination. The program command recorded in the medium may be designed or configured especially for the present disclosure or may be publicly known to those skilled in the computer software field and may be allowed to be used. Examples of the computer-readable recording medium may include magnetic media such as hard disk, floppy disk, and magnetic tape, optical media such as CD-ROM and DVD, magneto-optical media such as floptical disk, and a hardware device specially configured to store and implement program commands such as ROM, RAM, flash memory, and the like. In addition, the program commands may include, for example, high class language codes, which is executable in a computer by using an interpreter, as well as machine codes made by a compiler. The above-mentioned hardware device may be configured to operate as one or more software modules in order to perform operations in the present disclosure, and vice versa.

Although the present disclosure has been described in detail with reference to various embodiments, the present disclosure is not limited to the above-described embodiments, and the technical idea of the present disclosure may have the scope within which those skilled in the art field of the present disclosure are capable of making various modifications or correction without departing from the subject matter of the present disclosure claimed in the following claims.

The invention claimed is:

1. A radio access node device configured as a service based architecture (SBA), the radio access node device comprising:

a non-transitory memory to storage instructions; and
a processor configured to implement one or more of the instructions to perform communication using a message according to an inter-network function (NF) service based interface (SBI),
wherein the message includes a packet having a header, and the processor when performing communication, is further configured to:

classify the packet based on the header as at least one of a Control Plane (CP) packet or a User Plane (UP) packet, and
modify the header to include a destination address corresponding to an NF of the CP when the packet is the CP packet and to an NE of the UP when the packet is the UP packet, and
wherein the radio access node device is configured to communicate with the NF of the CP by using an SBI message without passing through an access and mobility management function (AME).

2. A radio access node device for providing a service to an accessed user equipment (UE), the radio access node device comprising:

a network function (NF) communication unit configured to perform communication required in association with provision of the service,
wherein the NF communication unit performs communication using a service based interface (SBD) message according to an inter-NF SBI,
wherein the SBI message includes a packet having a header,
wherein the NF communication unit classifies the packet based on the header as at least one of a Control Plane (CP) packet or a User Plane (UP) packet, and modifies the header to include a destination address corresponding to an NF of the CP when the packet is the CP packet and to an NE of the UP when the packet is the UP packet, and
wherein the NF communication unit is configured to communicate with the NF of the CP by using the SBI message without passing through an access and mobility management function (AMF).

3. The device of claim 2, wherein an NF that the NF communication unit communicates with is at least one of another node device for configuring a base station with the radio access node device, another radio access node device, an NF service in another radio access node device, the NF of the CP or the NF of the UP.

4. The device of claim 2, wherein the NF communication unit comprises an SBI module that processes the SBI message.

5. The device of claim 4, wherein the SBI module is configured to operate according to at least one of a request/response-based message transmission or reception scheme and a subscription/notification-based message transmission or reception scheme.

6. The device of claim 4, wherein the SBI module is configured to perform conversion between a message according to another interface and an SBI message according to the SBI for message transmission or reception.

7. The device of claim 2, wherein the NF communication unit is configured to use the SBI message when transmitting or receiving a message related to radio section handover of the UE.

8. The device of claim 2, wherein the NF communication unit is configured to use the SBI message when transmitting a notification according to detection of a specific event that is subscribed by the AMF.

9. The device of claim 2, wherein the NF communication unit is configured to use the SBI message when transmitting or receiving a message related to UE context of the UE.

10. The device of claim 2, wherein the NF communication unit is configured to communicate with a session management function (SMF) for managing and controlling a UE session by using the SBI message without passing through the AMF when processing session management of the UE.

11. The device of claim 2, wherein the NF communication unit is configured to communicate with a policy control function (PCF) for managing and controlling a plurality of policies including a QoS policy by using the SBI message without passing through the AMF when performing processing related to quality of the UE.

12. The device of claim 2, wherein the NF communication unit is configured to communicate by using the SBI message without passing through the AMF when processing registration that registers an NF of the radio access node device with a network repository function (NRF) for managing and controlling information associated with each NF in a network.

13. An interface method performed by a radio access node device, the method comprising:

performing communication related to provision of a service provided to an accessed user equipment (UE), wherein the communication operation performs communication using an SBI message according to an inter-Network Function (NF) service based interface (SBI), wherein performing communication includes:

classifying the packet based on the header as at least one of a Control Plane (CP) packet or a User Plane (UP) packet modifying the header to include a destination address corresponding to an NF of the CP when the packet is the CP packet and to an NF of the UP when the packet is the UP packet, and communicating with the NE of the CP by using an SBI message without passing through an access and mobility management function (AMF).

* * * * *